United States Patent
Ezaki

(10) Patent No.: US 10,149,323 B2
(45) Date of Patent: Dec. 4, 2018

(54) BASE STATION AND CONTROL METHOD

(71) Applicant: FUJITSU LIMITED, Kawasaki-shi, Kanagawa (JP)

(72) Inventor: Takato Ezaki, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 191 days.

(21) Appl. No.: 14/969,371

(22) Filed: Dec. 15, 2015

(65) Prior Publication Data

US 2016/0192394 A1 Jun. 30, 2016

(30) Foreign Application Priority Data

Dec. 26, 2014 (JP) ................. 2014-266494

(51) Int. Cl.
*H04W 74/08* (2009.01)
*H04W 88/08* (2009.01)

(52) U.S. Cl.
CPC ........ *H04W 74/0833* (2013.01); *H04W 88/08* (2013.01)

(58) Field of Classification Search
USPC ........................................ 370/329
See application file for complete search history.

(56) References Cited

U.S. PATENT DOCUMENTS

| 8,818,283 | B2 * | 8/2014 | McHenry | H04W 16/14 |
| | | | | 455/62 |
| 2010/0173637 | A1 * | 7/2010 | Damnjanovic | H04L 5/0007 |
| | | | | 455/447 |
| 2011/0280201 | A1 * | 11/2011 | Luo | H04W 72/0406 |
| | | | | 370/329 |
| 2011/0286555 | A1 * | 11/2011 | Cho | H04L 27/0006 |
| | | | | 375/343 |
| 2012/0263095 | A1 * | 10/2012 | Quan | H04W 52/0216 |
| | | | | 370/312 |
| 2012/0282889 | A1 * | 11/2012 | Tanaka | H04J 11/0053 |
| | | | | 455/405 |
| 2013/0034001 | A1 * | 2/2013 | Mizusawa | H04W 16/14 |
| | | | | 370/252 |

(Continued)

FOREIGN PATENT DOCUMENTS

JP  2011-114716 A  6/2011

*Primary Examiner* — Phong La
(74) *Attorney, Agent, or Firm* — Arent Fox LLP

(57) ABSTRACT

A base station including: a memory, and a processor configured to: determine whether each random access signal is detected or not by comparing each of specified characteristics of each of radio resources prepared for each random access signal with a detection threshold, each of the specified characteristics relating to each reception power of each of the radio resources prepared for each random access signal, the radio resources being divided into first radio resources and second radio resources, the first radio resource being prepared for dedicated random access signals each transmitted from each terminal in response to each request signal transmitted from the base station, and determine the detection threshold based on each of the specified characteristics of each of unused first radio resources, each of the unused first radio resource being each of the first radio resources for which each request signal has not been transmitted from the base station.

6 Claims, 14 Drawing Sheets

(56) References Cited

U.S. PATENT DOCUMENTS

| | | | |
|---|---|---|---|
| 2013/0157680 A1* | 6/2013 | Morita | H04W 52/244 455/452.2 |
| 2013/0170444 A1* | 7/2013 | Pani | H04W 72/0413 370/329 |
| 2013/0322493 A1* | 12/2013 | Jersenius | H04W 72/0446 375/133 |
| 2014/0010214 A1* | 1/2014 | Hooli | H04J 13/0062 370/336 |
| 2014/0086173 A1* | 3/2014 | Sadeghi | H04L 5/005 370/329 |
| 2014/0169260 A1* | 6/2014 | Nishio | H04W 74/0833 370/312 |
| 2014/0349659 A1* | 11/2014 | Ishii | H04W 8/082 455/444 |
| 2015/0003418 A1* | 1/2015 | Rosa | H04W 36/0005 370/331 |
| 2015/0171983 A1* | 6/2015 | Kusashima | H04J 11/004 370/329 |
| 2015/0181546 A1* | 6/2015 | Freda | H04W 56/0015 370/336 |
| 2015/0223085 A1* | 8/2015 | Siomina | H04W 52/0206 370/252 |
| 2015/0305066 A1* | 10/2015 | Jeong | H04W 74/0833 370/225 |
| 2016/0119887 A1* | 4/2016 | Charipadi | H04W 56/001 370/335 |
| 2016/0165547 A1* | 6/2016 | Ouchi | H04W 52/146 455/522 |
| 2016/0270057 A1* | 9/2016 | Yu | H04W 16/18 |
| 2017/0111884 A1* | 4/2017 | Sadeghi | H04W 68/02 |
| 2017/0127328 A1* | 5/2017 | Ishii | H04W 36/22 |

* cited by examiner

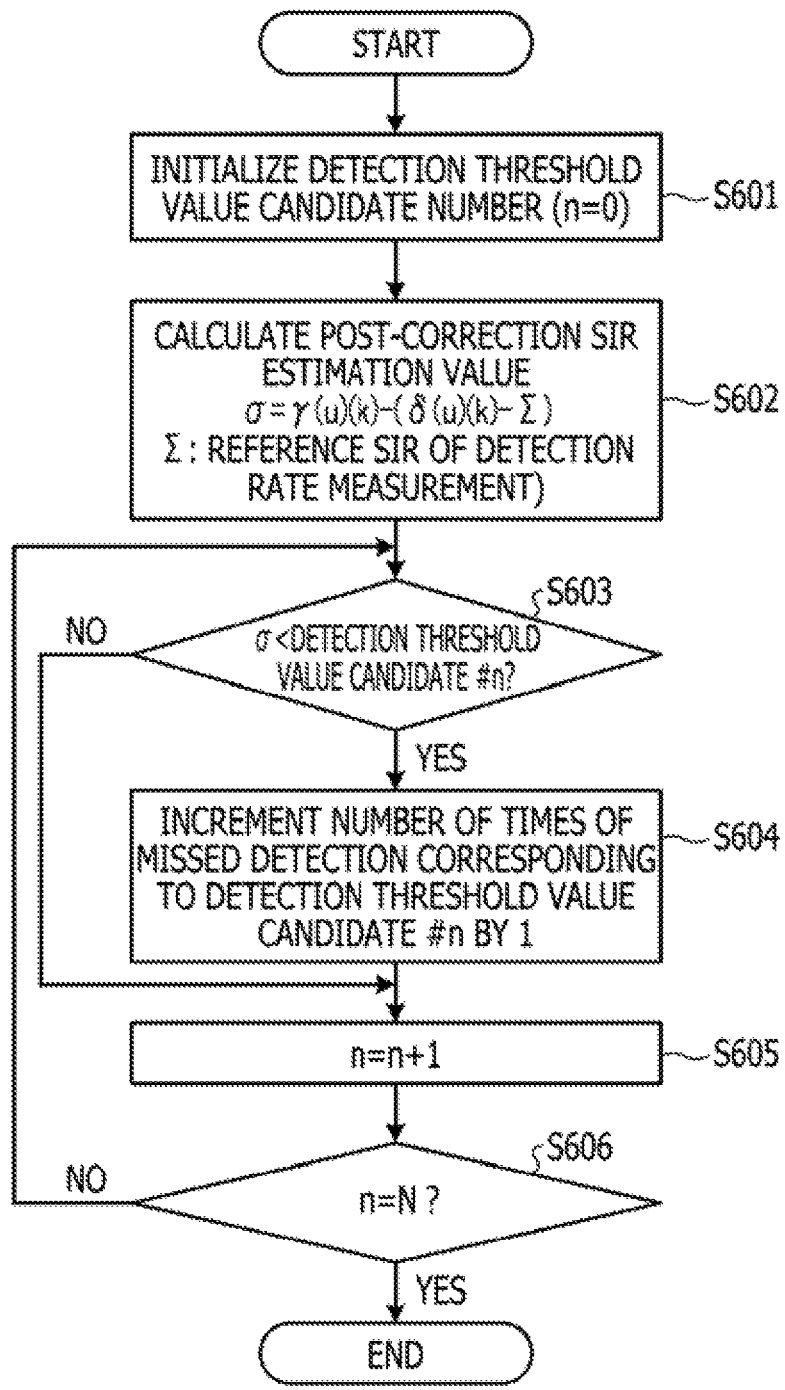

BASE STATION AND CONTROL METHOD

CROSS-REFERENCE TO RELATED APPLICATION

This application is based upon and claims the benefit of priority of the prior Japanese Patent Application No. 2014-266494, filed on Dec. 26, 2014, the entire contents of which are incorporated herein by reference.

FIELD

The embodiments discussed herein are related to a base station and a control method of a base station.

BACKGROUND

In some mobile communication systems including Long Term Evolution (LTE), uplink synchronization establishment between a terminal and a wireless base station apparatus is performed using a channel that a certain user is allowed to use, which is called a random access channel (RACH). A series of procedures for establishing such uplink synchronization is called a RACH procedure, and is obtained, for example, by the following procedure in the LTE.

A mobile communication terminal transmits a RACH preamble to a wireless base station apparatus using a physical random access channel (PRACH). A time period in which the transmission of the RACH preamble through the PRACH is performed and the range of wireless resources are notified, in advance, to the mobile communication terminal using broadcast information from the wireless base station apparatus. However, it is difficult for the wireless base station apparatus to recognize a resource used for the transmission through the PRACH from among the notified wireless resources and timing at which the resource is used in the notified time period. Therefore, the wireless base station apparatus determines the presence or absence of transmission through the PRACH in each of the wireless resources by performing reception for all of the wireless resources of the specified range in the specified time period. When the wireless base station apparatus determines the presence of the transmission, the wireless base station apparatus secures a wireless resource of a RACH Message 3, and transmits information on the wireless resource to the mobile communication terminal using a RACH response for the PRACH resource. The mobile communication terminal tries to perform reception of the transmitted RACH response for the PRACH resource, and transmits the RACH Message 3 using the wireless resource that has been notified using the RACH response when the reception has been performed successfully. In the RACH Message 3, a connection request and the like from the mobile communication terminal are stored. The mobile communication terminal assigns a unique ID that identifies the terminal of the self to the RACH Message 3 for the first time. The wireless base station apparatus tries to perform reception of the RACH Message 3 and when the reception has been performed successfully, the wireless base station apparatus notifies the mobile communication terminal of the ID stored in the RACH Message 3 using a RACH Message 4. The mobile communication terminal receives the RACH Message 4, and confirms the stored ID. When the ID corresponds to the mobile communication terminal of the self, the mobile communication terminal determines that uplink synchronization establishment has been performed successfully, and ends the RACH procedure. On the contrary, when the stored ID does not correspond to the mobile communication terminal of the self, the mobile communication terminal performs the RACH procedure again.

Here, it is difficult to accurately determine the presence or absence of transmission through the PRACH from among channels used for the RACH procedure in the wireless base station apparatus because the transmission through the PRACH depends on a wireless environment such as noise or a transmission path, or there is no information indicating when the user uses the PRACH for transmission. Therefore, there is possibility that the wireless base station apparatus fails to detect transmission through the PRACH even when the transmission through the PRACH has been performed (missed detection), or that the wireless base station apparatus detects transmission through the PRACH by mistake even when the transmission through the PRACH has not been performed (false alarm). In addition, the case in which the wireless base station apparatus fails to detect transmission through the PRACH even when the transmission through the PRACH has been actually performed may be referred to as "missed detection". In addition, the case in which false alarm occurs when the transmission through the PRACH is not performed may be referred to as "false alarm". In addition, in the following description, "missed detection" and "false alarm" may be collectively simply referred to as "detection error".

Specifically when the false alarm has occurred, the wireless base station apparatus performs allocation of a wireless resource of the RACH Message 3, and transmission of the RACH response, as a result of the false alarm for the transmission through the PRACH resource, which has not been performed. However, in this case, there is no mobile communication terminal that performs transmission of the RACH Message 3, so that the secured wireless resource is not used and become useless. In addition, a physical channel of the RACH Message 3 is a physical uplink shared channel (PUSCH) through which retransmission is performed, so that the wireless base station apparatus keeps a wireless resource for the retransmission until the number of times of retransmission reaches the maximum limit.

When such a useless wireless resource exists, throughputs of the entire cell are reduced, and a reduction in the accommodation efficiency is caused eventually. It is desirable that a threshold value of PRACH detection is determined appropriately to avoid such a reduction in the performance.

The wireless base station apparatus typically determines the presence or absence of the RACH preamble transmitted through a PRACH by comparing a reception signal to interference ratio (SIR) or some characteristic relating to reception power and a threshold value that has been set in advance. As the threshold value used for the detection becomes larger, a possibility becomes smaller that false alarm for the RACH preamble transmitted through the PRACH occurs in the wireless base station apparatus, but a possibility becomes larger that the wireless base station apparatus fails to detect the transmission through the PRACH that has been actually performed. On the contrary, as the threshold value becomes smaller, a possibility may become smaller that the wireless base station apparatus fails to detect the transmission through the PRACH that has been actually transmitted, but a possibility becomes larger that false alarm for the RACH preamble transmitted through the PRACH occurs. A trade-off relationship is established between a reduction in the false alarm and a reduction in the missed detection, and it is desirable that the threshold value is determined so that balance between the reduction in the false alarm and the reduction in the missed detection is maintained without bias.

For example, as a technology by which a detection threshold value of a preamble is determined, there is a technology in a related art by which a probability of false alarm of the preamble is calculated from the presence or absence of the preamble in a message that has been received from a mobile communication terminal, and a threshold value is determined from the calculated probability of the false alarm.

Japanese Laid-open Patent Publication No. 2011-114716 is the related art.

SUMMARY

According to an aspect of the invention, a base station includes a memory, and a processor coupled to the memory and configured to: determine whether each random access signal is detected or not by comparing each of specified characteristics of each of radio resources prepared for each random access signal with a detection threshold, each of the specified characteristics relating to each reception power of each of the radio resources prepared for each random access signal, the radio resources being divided into first radio resources and second radio resources, the first radio resource being prepared for dedicated random access signals each transmitted from each terminal in response to each request signal transmitted from the base station, the second radio resource being prepared for common random access signals each transmitted from each terminal in without each request signal transmitted from the base station, and determine the detection threshold based on each of the specified characteristics of each of unused first radio resources, each of the unused first radio resource being each of the first radio resources for which each request signal has not been transmitted from the base station.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 14 is s flowchart illustrating calculation processing of the number of times of missed detection by a missed detection threshold value calculation unit.

DESCRIPTION OF EMBODIMENTS

Figure 1:
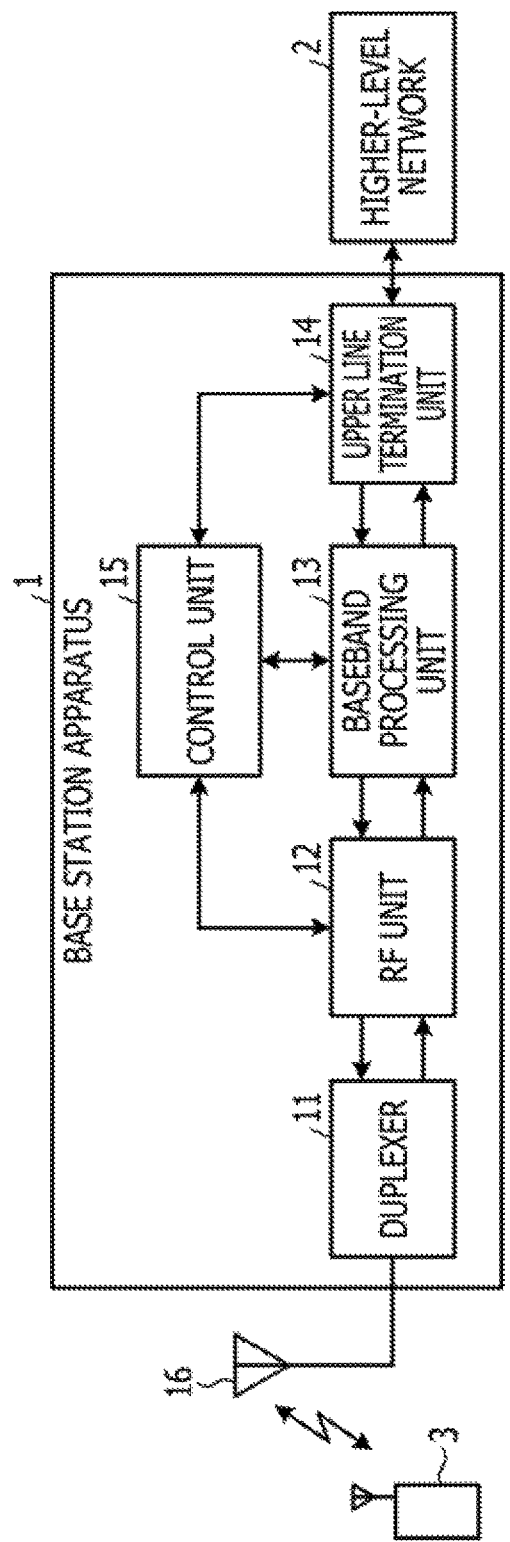
FIG. 1 is a block diagram illustrating a base station apparatus.

However, in an actual wireless environment, interference occurs due to various factors, so that a reception quality of a channel such as a PRACH is greatly affected. The influence from the interference is not fixed and changed from moment to moment. In addition, the nature of interference is different depending on the position of the cell.

It is difficult to use common and fixed threshold value between all cells for the RACH preamble reception through the PRACH under such various environments. In addition, even when an optimal threshold value is provided for each of the cells, it is desirable that the threshold value is determined after having been subjected to long-term evaluation such as a running test for each of the cells, so that it takes a long time to determine the threshold values. In addition, even when an optimal threshold value has been provided for each of the cells, it is difficult to become compatible with a changing environment using the fixed threshold value. That is, when the fixed threshold value is used, it is difficult to suppress occurrence of a detection error and to improve the utilization efficiency of the cell. For example, when a set threshold value is relatively lower than an optimal value under a changed radio wave environment, it becomes difficult to suppress occurrence of false alarm.

In addition, as described above, it is difficult for a base station apparatus to grasp, in advance, whether the RACH preamble is transmitted through a PRACH from the mobile communication terminal. Therefore, in the technology of the related art, a method is used in which a possibility of false alarm is calculated and a threshold value is determined by limiting a time range of a delay profile used to determine false alarm, to an excess portion in which the actual correlation peak does not appear. However, the method of the technology of the related art is not sufficient for measurement used to determine an optimal threshold value under a radio wave environment that changes from moment to moment, so that it is difficult to obtain an appropriate threshold value in the method. In addition, there may be a possibility that transmission of a preamble is performed, for the excess portion, that is, a delay profile portion of a cell radius setting or more, so that there is no guarantee that input of the preamble is not performed. Thus, in the technology of the related art, it is difficult to suppress a detection error (for example, false alarm or missed detection) and to improve the utilization efficiency of the cell.

The technology discussed herein has been made in view of the above problems, and an object of the technology discussed herein is to provide a base station apparatus and a base station apparatus control method by which the utilization efficiency of a cell is improved.

Embodiments of the base station apparatus and the base station apparatus control method discussed herein are described in detail below with reference to drawings. The base station apparatus and the base station apparatus control method discussed herein are not limited to the following embodiments.

[First Embodiment]

FIG. 1 is a block diagram illustrating a base station apparatus. As illustrated in FIG. 1, a base station apparatus 1 includes a duplexer 11, a radio frequency (RF) unit 12, a baseband processing unit 13, an upper line termination unit 14, a control unit 15, and an antenna 16.

The duplexer 11 receives a signal from a wireless communication terminal 3 through the antenna 16. In addition, the duplexer 11 outputs the received signal transmitted from the wireless communication terminal 3, to the RF unit 12. In addition, the duplexer 11 receives an input of a radio signal to be transmitted to the wireless communication terminal 3, from the RF unit 12. In addition, the duplexer 11 transmits the received radio signal to the wireless communication terminal 3 through the antenna 16.

The RF unit 12 receives the input of the radio signal transmitted from the wireless communication terminal 3, through the duplexer 11. In addition, the RF unit 12 converts the received radio signal into a digital signal by the analog-digital (AD) conversion. In addition, the RF unit 12 converts the converted digital signal into a baseband signal by frequency conversion. After that, the RF unit 12 outputs the generated baseband signal to the baseband processing unit 13.

In addition, the RF unit 12 receives an input of a baseband signal that is the signal to be transmitted to the wireless communication terminal 3, from the baseband processing unit 13. In addition, the RF unit 12 converts the received baseband signal into a radio signal by frequency conversion. In addition, the RF unit 12 converts the generated radio signal into an analog signal by digital-analog (DA) conversion. After that, the RF unit 12 outputs the radio signal to be transmitted to the wireless communication terminal 3, to the duplexer 11.

The baseband processing unit 13 receives the input of the signal that has been transmitted from the wireless communication terminal 3, through the RF unit 12. In addition, when the received signal corresponds to the RACH preamble transmitted through a PRACH, the baseband processing unit 13 executes the RACH procedure that is a series of procedures that establish the synchronization. In addition, when the received signal corresponds to a PUSCH or a physical uplink control channel (PUCCH), the baseband processing unit 13 executes demodulation processing and decoding processing for the received signal. In addition, the baseband processing unit 13 uses data that has been transmitted using the PUCCH, for example, for scheduling. In addition, for example, the baseband processing unit 13 outputs data that has been transmitted using the PUSCH, to the upper line termination unit 14.

The processing by the baseband processing unit 13 for the signal that has been transmitted from the wireless communication terminal 3 is described later in detail.

In addition, the baseband processing unit 13 receives an input of a signal to be transmitted to the wireless communication terminal 3, from the upper line termination unit 14. In addition, the baseband processing unit 13 executes coding processing and modulation processing for the received signal. In addition, the baseband processing unit 13 outputs the baseband signal that has been subjected to such processing, to the RF unit 12.

The upper line termination unit 14 couples the base station apparatus 1 and a higher-level network 2. The upper line termination unit 14 outputs data to be transmitted to the wireless communication terminal 3 and has been received from the higher-level network 2, to the baseband processing unit 13. In addition, the upper line termination unit 14 transmits the data that has been transmitted from the wireless communication terminal 3 through the baseband processing unit 13, to the network 2.

The control unit 15 turns the power source of the base station apparatus 1 on and off. In addition, the control unit 15 performs setting of parameters used for communication, on the RF unit 12, the baseband processing unit 13, and the upper line termination unit 14.

Figure 2:
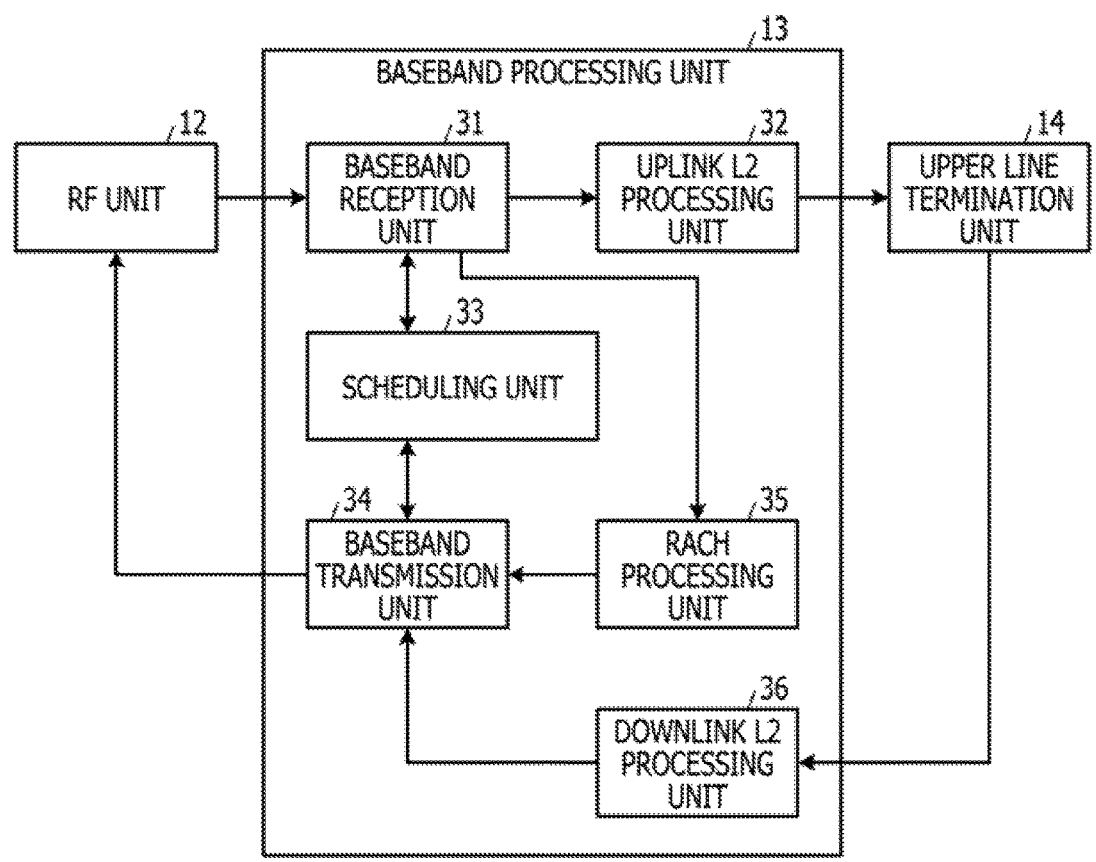
FIG. 2 is a block diagram illustrating the detail of a baseband processing unit.

FIG. 2 is a block diagram illustrating the detail of the baseband processing unit. As illustrated in FIG. 2, the baseband processing unit 13 includes a baseband reception unit 31, an uplink L2 processing unit 32, a scheduling unit 33, a baseband transmission unit 34, a RACH processing unit 35, and a downlink L2 processing unit 36.

When the signal that has been transmitted from the wireless communication terminal 3 corresponds to the RACH preamble transmitted through a PRACH, the baseband reception unit 31 executes the RACH procedure. For example, when the baseband reception unit 31 detects the transmission of the RACH preamble through the PRACH, the baseband reception unit 31 notifies the RACH processing unit 35 of the detection of the transmission through the PRACH.

In addition, when the signal that has been transmitted from the wireless communication terminal 3 is a signal that has been transmitted using a wireless resource of a PUSCH or a PUCCH, the baseband reception unit 31 receives the signal that has been transmitted from the wireless communication terminal 3 using information on a wireless resource that has been allocated to the wireless communication terminal 3, which has been notified from the scheduling unit 33. In addition, when the received signal corresponds to the PRACH, the baseband reception unit 31 executes processing used for PRACH detection and the subsequent synchronization establishment.

In addition, when the received signal is a signal that has been transmitted using a wireless resource of the PUCCH, the baseband reception unit 31 executes demodulation processing, decoding processing, and the like, for the received signal. In addition, the baseband reception unit 31 obtains control information such as PUSCH transmission completion notification and a signal quality included in the received signal, and outputs the information to the scheduling unit 33. In addition, when the received signal corresponds to the PUSCH, the baseband reception unit 31 executes demodulation processing, decoding processing, and the like, for the received signal. In addition, the baseband reception unit 31 outputs data included in the received signal, to the uplink L2 processing unit 32.

Figure 3:
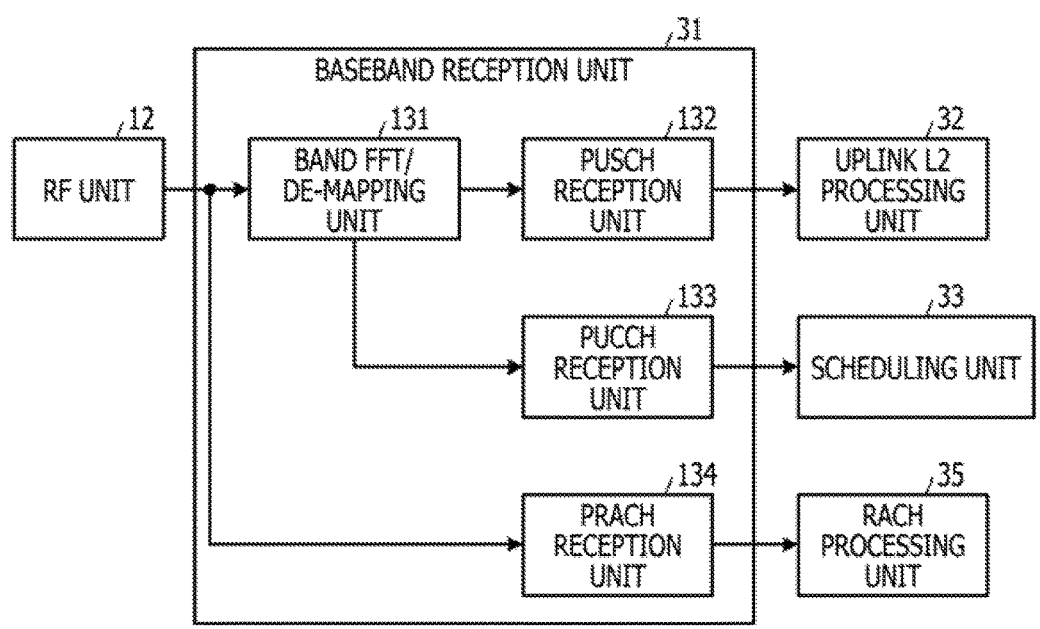
FIG. 3 is a block diagram illustrating the detail of a baseband reception unit.

The detail of the baseband reception unit 31 is described below with reference to FIG. 3. FIG. 3 is a block diagram illustrating the detail of the baseband reception unit. As illustrated in FIG. 3, the baseband reception unit 31 includes a band fast Fourier transform (FFT)/de-mapping unit 131, a PUSCH reception unit 132, a PUCCH reception unit 133, and a PRACH reception unit 134.

When the signal of the PUSCH or the PUCCH is transmitted to the band FFT/de-mapping unit 131, the band FFT/de-mapping unit 131 executes FFT for the received signal, and converts the signal into a signal of a frequency area. After that, the band FFT/de-mapping unit 131 executes de-mapping processing in which the converted signal of the frequency area is separated into physical channels.

After that, the band FFT/de-mapping unit 131 outputs the signal to the PUSCH reception unit 132 when the received signal corresponds to the PUSCH. In addition, the band FFT/de-mapping unit 131 outputs the signal to the PUCCH reception unit 133 when the received signal is a control signal of the PUCCH.

The PUSCH reception unit 132 receives the input of the signal of the PUSCH from the band FFT/de-mapping unit 131. In addition, the PUSCH reception unit 132 performs channel estimation based on a reference signal of the PUSCH. After that, the PUSCH reception unit 132 performs channel equalization of the signal of the PUSCH, in accordance with the channel estimation result, and executes the demodulation processing for the signal. In addition, the PUSCH reception unit 132 decodes the demodulated signal. After that, the PUSCH reception unit 132 outputs the decoded signal to the uplink L2 processing unit 32.

The PUCCH reception unit 133 receives the input of the signal of the PUCCH, from the band FFT/de-mapping unit 131. In addition, the PUCCH reception unit 133 performs channel estimation based on a reference signal of the PUCCH. After that, the PUCCH reception unit 133 performs channel equalization of the signal of the PUCCH, in accordance with the channel estimation result, and executes the demodulation processing for the control signal. In addition, the PUCCH reception unit 133 decodes the demodulated control signal. After that, the PUCCH reception unit 133 outputs the decoded control signal to the scheduling unit 33.

When the signal that has been transmitted from the wireless communication terminal 3 corresponds to the RACH preamble transmitted through the PRACH, the PRACH reception unit 134 receives the RACH preamble transmitted through the PRACH from the RF unit 12. In addition, the PRACH reception unit 134 executes the detection processing for the RACH preamble transmitted through the PRACH. When the PRACH reception unit 134 detects transmission through the PRACH, the PRACH reception unit 134 notifies the RACH processing unit 35 of the detection of the transmission through the PRACH.

Figure 4:
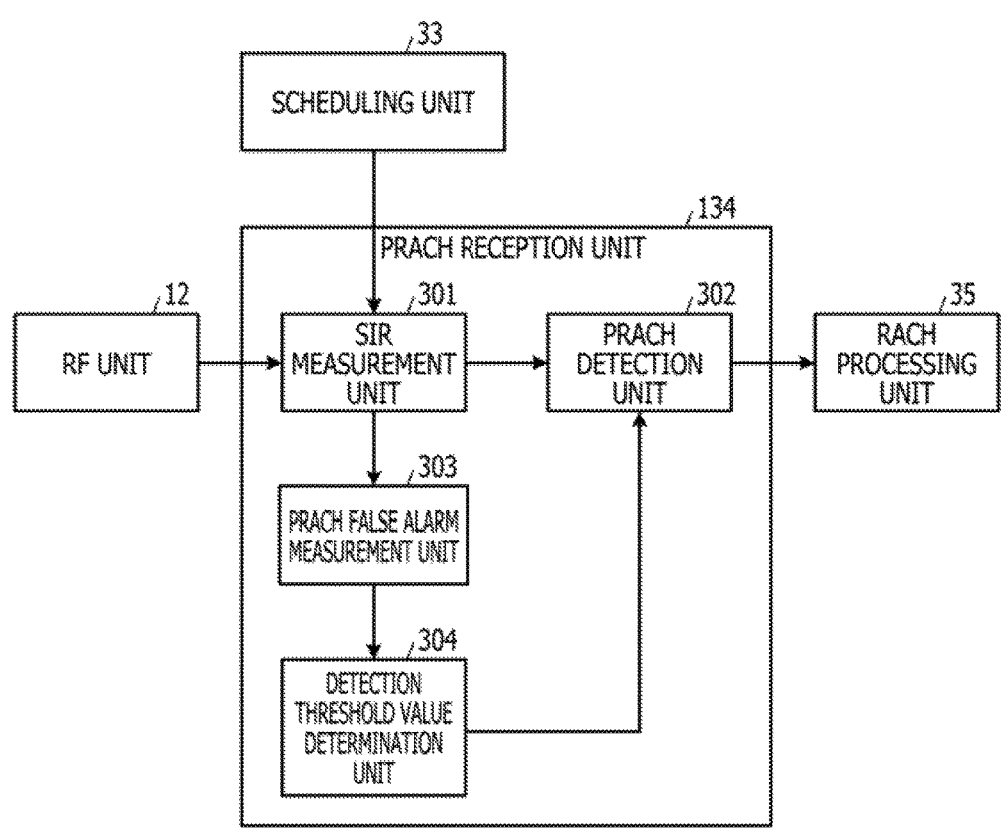
FIG. 4 is a block diagram illustrating the detail of a PRACH reception unit according to a first embodiment.

The detection processing of the RACH preamble transmitted through the PRACH by the PRACH reception unit 134 is described in detail below with reference to FIG. 4. FIG. 4 is a block diagram illustrating the detail of the PRACH reception unit according to a first embodiment.

As illustrated in FIG. 4, the PRACH reception unit 134 includes an SIR measurement unit 301, a PRACH detection unit 302, a PRACH false alarm measurement unit 303, and a detection threshold value determination unit 304.

The SIR measurement unit 301 obtains scheduling information of a dedicated preamble of the RACH preamble transmitted through the PRACH, from the scheduling unit 33.

Figure 5:
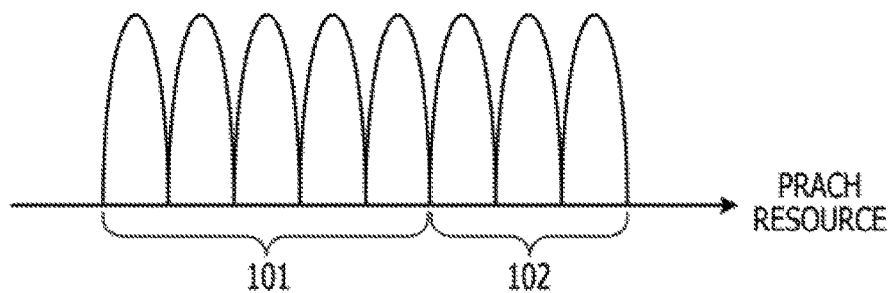
FIG. 5 is a schematic diagram illustrating wireless resources used for a PRACH.

The RACH preamble transmitted through the PRACH is described below. FIG. 5 is a schematic diagram illustrating wireless resources used for the RACH preamble transmitted through the PRACH. In FIG. 5, the horizontal axis indicates PRACH resources. As illustrated in FIG. 5, in the base station apparatus 1, for example, wireless resources used for a plurality of preamble signal sequences are provided, as wireless resources used for the RACH preamble transmitted through the PRACH. From among the wireless resources, a wireless resource group 101 is wireless resources from which all wireless communication terminals 3 are allowed to perform transmission of the RACH preamble through a PRACH randomly. Hereinafter, such a wireless resource is referred to as "common preamble resource". The common preamble is also referred to as a contention based preamble or a contention base signature. In addition, a wireless resource group 102 other than the common preamble resources is reserved as wireless resources used for a dedicated preamble used for dedicated allocation, which is instructed (or requested) to be transmitted to a certain wireless communication terminal 3 by the base station apparatus 1. Hereinafter, such a wireless resource used for a dedicated preamble is referred to as "dedicated preamble resource". The dedicated preamble is also referred to as a non-contention based preamble (contention free preamble) or a non-contention based signature (contention free signature).

The wireless resources used for the RACH preamble transmitted through the PRACH and the plurality of preamble signal sequences correspond to 64 preamble sequences generated by performing cyclic shift of Zadoff-Chu (ZC) sequences that have been generated by using an initial value parameter set for each cell. In addition, the length of each of the preamble sequences is 839. In addition, from among such 64 preamble sequences, sequences having a certain number are allocated as (or prepared for) the common preamble resources, and the remaining preamble sequences are used as (or prepared for) the dedicated preamble resources randomly.

For example, a case is described below in which the first to K-th wireless resources are used as dedicated preamble resources, and the K+1-th to N-th wireless resources are used as common preamble resources, from among the wireless resources. In this case, when a usage instruction of the dedicated preamble resources that are the first to the K-th preambles is issued from the base station apparatus 1 to the wireless communication terminal 3, the wireless communication terminal 3 may use the dedicated preamble resources. That is, the dedicated preamble resources are not used by the wireless communication terminal 3 when there is no usage instruction of the dedicated preamble resources by the base station apparatus 1. In addition, the K+1-th to the N-th preambles are common preambles, and management of usage permission of the common preambles is not performed by the base station apparatus 1, and the common preambles are determined to be used by the wireless communication terminal 3. It does not have to select a preamble reserved for dedicated allocation of a small number, and a preamble of a certain number may be selected as described above.

The SIR measurement unit 301 identifies a dedicated preamble resource to which a usage instruction is not issued from the scheduling unit 33, using scheduling information.

The SIR measurement unit 301 receives the RACH preamble transmitted through the PRACH from the RF unit 12. In addition, the SIR measurement unit 301 calculates an SIR estimation value for an unused dedicated preamble resource, in addition to a preamble resource other than the dedicated preamble resources and a dedicated preamble resource specified to be used.

The SIR measurement unit 301 outputs the calculated SIR estimation value of the unused dedicated preamble resource, to the PRACH false alarm measurement unit 303. In addition, the SIR measurement unit 301 outputs the SIR estimation values of the preamble resource other than the dedicated preamble resources and the dedicated preamble resource specified to be used, to the PRACH detection unit 302.

The PRACH false alarm measurement unit 303 stores a plurality of detection threshold value candidates that are candidates of detection threshold values used to detect the RACH preamble transmitted through the PRACH, in advance. It is desirable that detection threshold value candidates have values distributed around a typical detection threshold value used to detect the RACH preamble transmitted through the PRACH. For example, the detection threshold value candidate may be generated by increasing or decreasing the reference value at certain intervals. The PRACH false alarm measurement unit 303 receives the input of the SIR estimation value of the unused dedicated preamble resource, from the SIR measurement unit 301. In addition, the PRACH false alarm measurement unit 303 adds "1" to the number of times of false alarm, for a detection threshold value candidate that falls below the SIR estimation value, from among the detection threshold value candidates.

The PRACH false alarm measurement unit 303 repeats counting of the number of times of false alarm using PRACHs having a certain number, by the certain number of times. After that, the PRACH false alarm measurement unit 303 outputs the number of times of false alarm of each of the detection threshold value candidates, to the detection threshold value determination unit 304. The PRACH false alarm measurement unit 303 is an example of "false alarm detection unit".

The detection threshold value determination unit 304 receives the input of the number of times of false alarm of each of the detection threshold value candidates, from the PRACH false alarm measurement unit 303. After that, the detection threshold value determination unit 304 divides the number of times of false alarm, by the number of tests, for each of the detection threshold value candidates, to calculate a false alarm rate of each of the detection threshold value candidates. The number of tests is set in advance.

In addition, the detection threshold value determination unit 304 stores a reference false alarm rate in advance. Here, it is desirable that the reference false alarm rate is determined in accordance with the operation state of the base station apparatus 1 such as the allowable range of false alarm and the allowable range of missed detection.

The detection threshold value determination unit 304 determines, as a detection threshold value, a detection threshold value candidate in which the false alarm ratio is less than the reference false alarm rate and has the largest value, from among the calculated false alarm rates of each of the detection threshold value candidates. Here, as the detection threshold value has a smaller value, a possibility that false alarm occurs for the SIR estimation value of the unused dedicated preamble resource (that is, a possibility that the SIR estimation value exceeds the detection threshold value candidate) is increased. That is, the detection threshold value determination unit 304 may determine, as a detection threshold value, a detection threshold value candidate in which the false alarm rate is less than the reference false alarm rate, from among the false alarm rates of the calculated detection threshold value candidates, and that has the smallest value. As a result, the detection threshold value may be optimized so that the probability of the missed detection is reduced while the false alarm rate becomes within the allowable range that is less than the reference false alarm rate. The detection threshold value determination unit 304 outputs the determined detection threshold value to the PRACH detection unit 302.

The PRACH detection unit 302 receives the input of the detection threshold value that has been determined by the detection threshold value determination unit 304. In addition, the PRACH detection unit 302 sets the received detection threshold value as a new detection threshold value.

In addition, the PRACH detection unit 302 receives the inputs of the SIR estimation values of the common preamble resource and the dedicated preamble resource specified to be used, from the SIR measurement unit 301. In addition, when the SIR measurement value is the set detection threshold value or more, the PRACH detection unst 302 determines that the RACH preamble transmitted through the PRACH has been detected. When the PRACH detection unit 302 determines that the RACH preamble transmitted through the PRACH has been detected, the PRACH detection unit 302 notifies the RACH processing unit 35 of the detection of the RACH preamble transmitted through the PRACH. The PRACH detection unit 302 is an example of "detection unit".

Returning to FIG. 2, the uplink L2 processing unit 32 receives the input of the data from the baseband reception unit 31. In addition, the uplink L2 processing unit 32 executes L2 processing including radio link control (RLC) layer processing or packet data control protocol (PDCP) layer processing, for the received data. After that, the uplink L2 processing unit 32 outputs the data that has been subjected to the processing, to the upper line termination unit 14.

The scheduling unit 33 receives the control information of the wireless communication terminal 3 from the baseband reception unit 31. In addition, the scheduling unit 33 allocates wireless resources of the PUCCH and the PUSCH to the wireless communication terminal 3, for example, using the received control information. In addition, the scheduling unit 33 transmits information on the allocated wireless resources, to the baseband transmission unit 34 and the baseband reception unit 31.

The RACH processing unit 35 receives the notification of the detection of the RACH preamble transmitted through the PRACH, from the PRACH detection unit 302. In addition, the RACH processing unit 35 generates a RACH Message 2, and secures a wireless resource used to perform transmission of a RACH Message 3. In addition, the RACH processing unit 35 transmits the RACH Message 2 to the baseband transmission unit 34, and notifies the baseband transmission unit 34 of information on the secured wireless resource.

After that, when the RACH Message 3 is received at the baseband reception unit 31, the RACH processing unit 35 receives the input of the RACH Message 3 from the baseband reception unit 31. In addition, the RACH processing unit 35 obtains an identifier (ID) of the wireless communication terminal 3, which is stored in the received RACH Message 3. After that, the RACH processing unit 35 generates a RACH Message 4 used to perform notification of the obtained ID. In addition, the RACH processing unit 35 transmits the RACH Message 4 to the baseband transmission unit 34.

The baseband transmission unit 34 receives the RACH Message 2 from the RACH processing unit 35. In addition, the baseband transmission unit 34 executes coding processing and modulation processing for the RACH Message 2 using the wireless resource specified by the RACH processing unit 35 to generate a baseband signal. After that, the baseband transmission unit 34 outputs the RACH Message 2 that has been subjected to the processing, to the RF unit 12. In addition, the baseband transmission unit 34 receives the RACH Message 4 from the RACH processing unit 35. In addition, the baseband transmission unit 34 executes the coding processing and the modulation processing for the RACH Message 4 to generate a baseband signal. After that, the baseband transmission unit 34 outputs the RACH Message 4 that has been subjected to the processing, to the RF unit 12.

The downlink L2 processing unit 36 receives an input of a signal to be transmitted to the wireless communication terminal 3 from the upper line termination unit 14. The downlink L2 processing unit 36 executes the L2 processing including the RLC layer processing or the PDCP layer processing, for the received signal. After that, the downlink L2 processing unit 36 outputs the signal that has been subjected to the processing, to the baseband transmission unit 34.

The baseband transmission unit 34 receives the information on the wireless resource that has been allocated to the wireless communication terminal 3, from the scheduling unit 33. After that, the baseband transmission unit 34 receives the input of the signal to be transmitted to the wireless communication terminal 3, from the downlink L2 processing unit 36. In addition, the baseband transmission unit 34 executes the coding processing and the modulation processing for the received signal, in accordance with the information on the wireless resource that has been allocated to the wireless communication terminal 3 to generate a baseband signal. After that, the baseband transmission unit 34 outputs the signal that has been subjected to the processing, to the RF unit 12.

Figure 6:
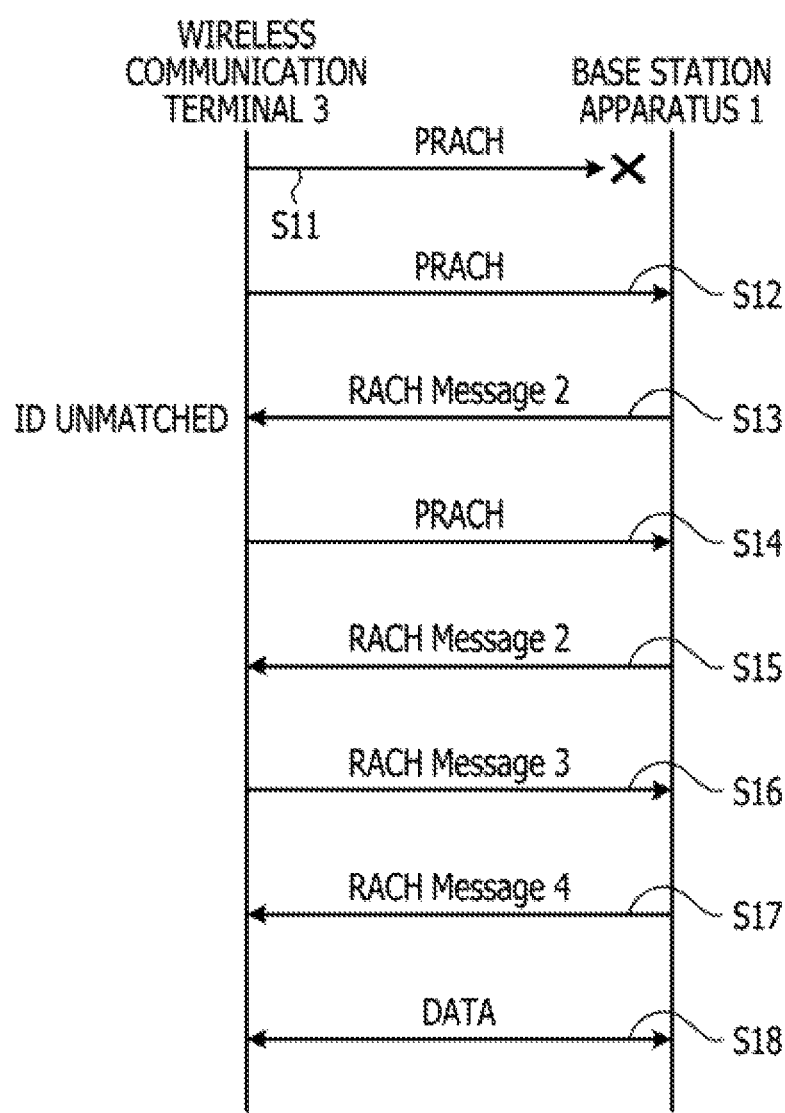
FIG. 6 is a sequence diagram illustrating a RACH procedure.

A series of processing procedures of the RACH procedure is described below with reference to FIG. 6. FIG. 6 is a sequence diagram illustrating the RACH procedure. Here, a typical example in which communication establishment is not performed successfully is also described.

The wireless communication terminal 3 selects a wireless resource used for the RACH preamble transmitted through the PRACH randomly, and transmits the RACH preamble transmitted through the PRACH to the base station apparatus 1 through the PRACH (Step S11). After that, when the base station apparatus 1 does not receive a RACH Message 2, the wireless communication terminal 3 repeats retransmission of the RACH preamble transmitted through the PRACH so as to increase the transmission power (Step S12). Such processing in which the retransmission is performed so that transmission power is increased may be referred to as "power ramping".

The PRACH reception unit 134 of the base station apparatus 1 performs detection of the RACH preamble transmitted through the PRACH. When the PRACH reception unit 134 has detected the RACH preamble transmitted through the PRACH, the PRACH reception unit 134 notifies the RACH processing unit 35 of the detection of the RACH preamble transmitted through the PRACH. When the RACH processing unit 35 receives the notification of the detection of the RACH preamble transmitted through the PRACH, the RACH processing unit 35 generates a RACH Message 2 and secures a wireless resource. After that, the RACH processing unit 35 transmits the RACH Message 2 to all wireless communication terminals 3 in the communication area through the baseband transmission unit 34 and the RF unit 12 (Step S13). The RACH Message 2 is called a RACH response. In the RACH Message 2, a number (preamble ID) of the detected PRACH, a provisional cell-radio network temporary identifier (C-RNTI), transmission timing information, and allocation information are included.

The wireless communication terminal 3 tries to receive the RACH Message 2 corresponding to the RACH preamble transmitted through the PRACH. In addition, the wireless communication terminal 3 determines whether the preamble ID of the RACH preamble transmitted through the PRACH is included in the received RACH Message 2. When the preamble ID of the preamble that has been transmitted through the PRACH is not included in the received RACH Message 2, and the reception of the RACH Message 2 is not performed successfully, the wireless communication terminal 3 performs retransmission of the RACH preamble through the PRACH (Step S14). The RACH processing unit 35 of the base station apparatus 1 performs retransmission of the RACH Message 2, as a response for the RACH preamble transmitted through the PRACH (Step S15).

When the wireless communication terminal 3 receives the RACH Message 2 that has been transmitted from the base station apparatus 1, and the preamble ID of the RACH preamble transmitted through the PRACH is included in the RACH Message 2, the wireless communication terminal 3 determines that the reception has been performed successfully. When the reception of the RACH Message 2 has been performed successfully, the wireless communication terminal 3 transmits a RACH Message 3 to the base station apparatus 1 using the wireless resource that has been notified using the RACH Message 2 (Step S16). The RACH Message 3 is referred to as a radio resource control (RRC) connection request. In the RACH Message 3, a connection request from the wireless communication terminal 3 to the base station apparatus 1 and the like are stored. In addition, the wireless communication terminal 3 performs transmission of an ID that is specific to the wireless communication terminal of the self, using the RACH Message 3.

The PUSCH reception unit 132 of the base station apparatus 1 performs reception of the RACH Message 3 that has been transmitted using the PUSCH, and notifies the scheduling unit 33 of the reception of the RACH Message 3 when the reception has been performed successfully. The scheduling unit 33 notifies the baseband transmission unit 34 of a wireless resource through which a RACH Message 4 that stores the ID that has been stored in the RACH Message 3 is transmitted. In addition, the baseband transmission unit 34 transmits the RACH Message 4 to the wireless communication terminal 3, using the specified wireless resource (Step S17). In addition, the baseband transmission unit 34 notifies the wireless communication terminal 3 of control information used to perform the radio resource control (RRC) connection, using the RACH Message 4.

The wireless communication terminal 3 tries to receive the RACH Message 4. When the wireless communication terminal 3 has received the RACH Message 4, the wireless communication terminal 3 confirms whether the ID of the wireless communication terminal is included in the RACH Message 4. When the ID of the wireless communication terminal of the self is included in the RACH Message 4, the wireless communication terminal 3 completes the random access processing, and establishes connection with the base station apparatus 1. After that, the wireless communication terminal 3 and the base station apparatus 1 performs transmission and reception of data on the established connection (Step S18). In addition, when the ID of the wireless communication terminal of the self is not included in the RACH Message 4, the wireless communication terminal 3 determines that the random access processing has not been executed successfully, and repeats the RACH procedure from the transmission of the RACH preamble through the PRACH again.

Figure 7:
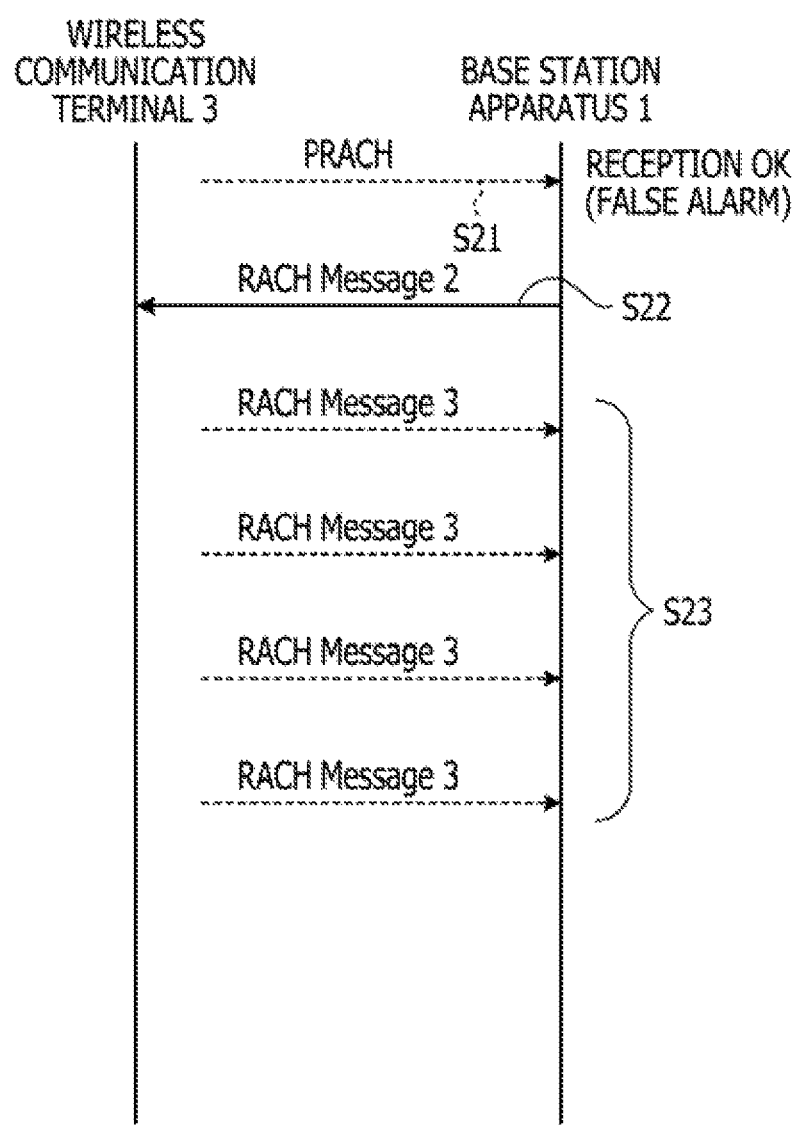
FIG. 7 is a sequence diagram illustrating an example of a case in which false alarm occurs in the RACH procedure.

A flow of processing when false alarm has occurred is described below with reference to FIG. 7. FIG. 7 is a sequence diagram illustrating an example of a case in which false alarm has occurred in the RACH procedure.

False alarm of the RACH preamble that has not been transmitted through the PRACH from the wireless communication terminal 3 occurs in the PRACH reception unit 134 of the base station apparatus 1 (Step S21).

When false alarm of the preamble that has not been transmitted through the PRACH occurs, the base station apparatus 1 performs allocation of a wireless resource of the RACH Message 3 that is a response for a RACH Message 2 to be transmitted. In addition, the RACH processing unit 35 of the base station apparatus 1 generates the RACH Message 2, and transmits the generated RACH Message 2 to the wireless communication terminal 3 (Step S22).

However, there is no wireless communication terminal 3 that performs transmission of a RACH Message 3. Therefore, the base station apparatus 1 does not receive a signal through the secured wireless resource of the RACH Message 3, so that the wireless resource becomes useless (Step S23). The wireless base station apparatus 1 keeps securing the wireless resource for retransmission until the number of times of transmission reaches the maximum limit. The dashed arrowed line indicating the RACH Message 3 in Step S23 of FIG. 7 indicates that the wireless resource is merely secured, but is not used actually.

Therefore, the base station apparatus according to the embodiment 1 may reduce such a useless wireless resource by reducing false alarm for the RACH preamble transmitted through the PRACH.

Figure 8:
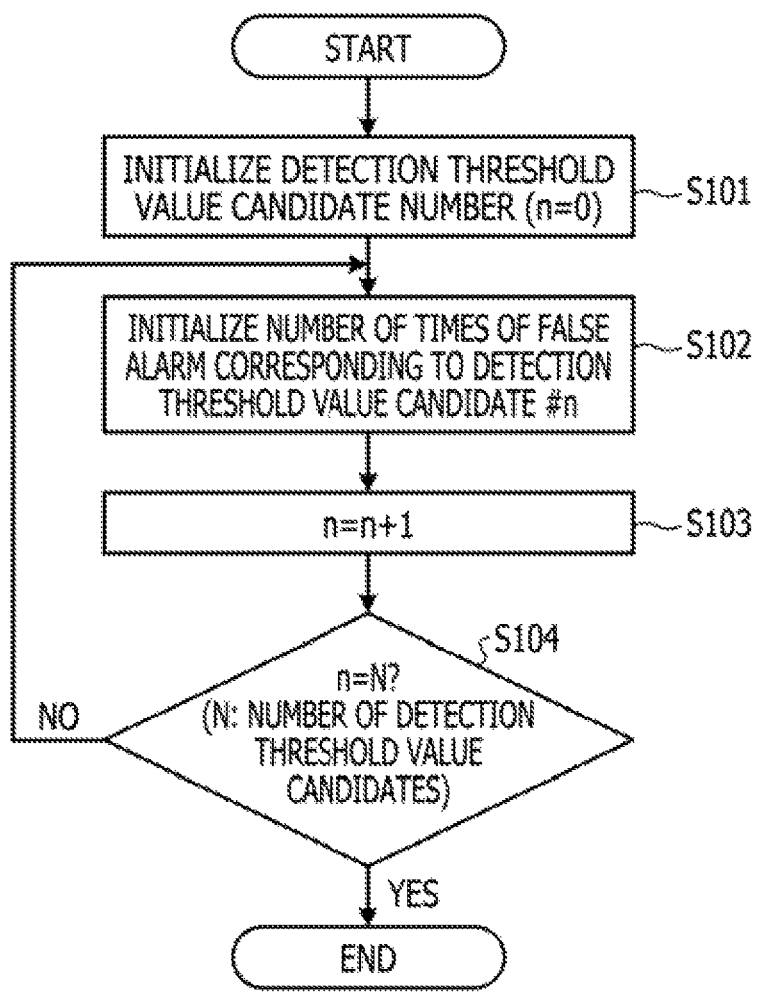
FIG. 8 is a flowchart illustrating initialization processing of the number of times of false alarm by a PRACH false alarm measurement unit.
Figure 9:
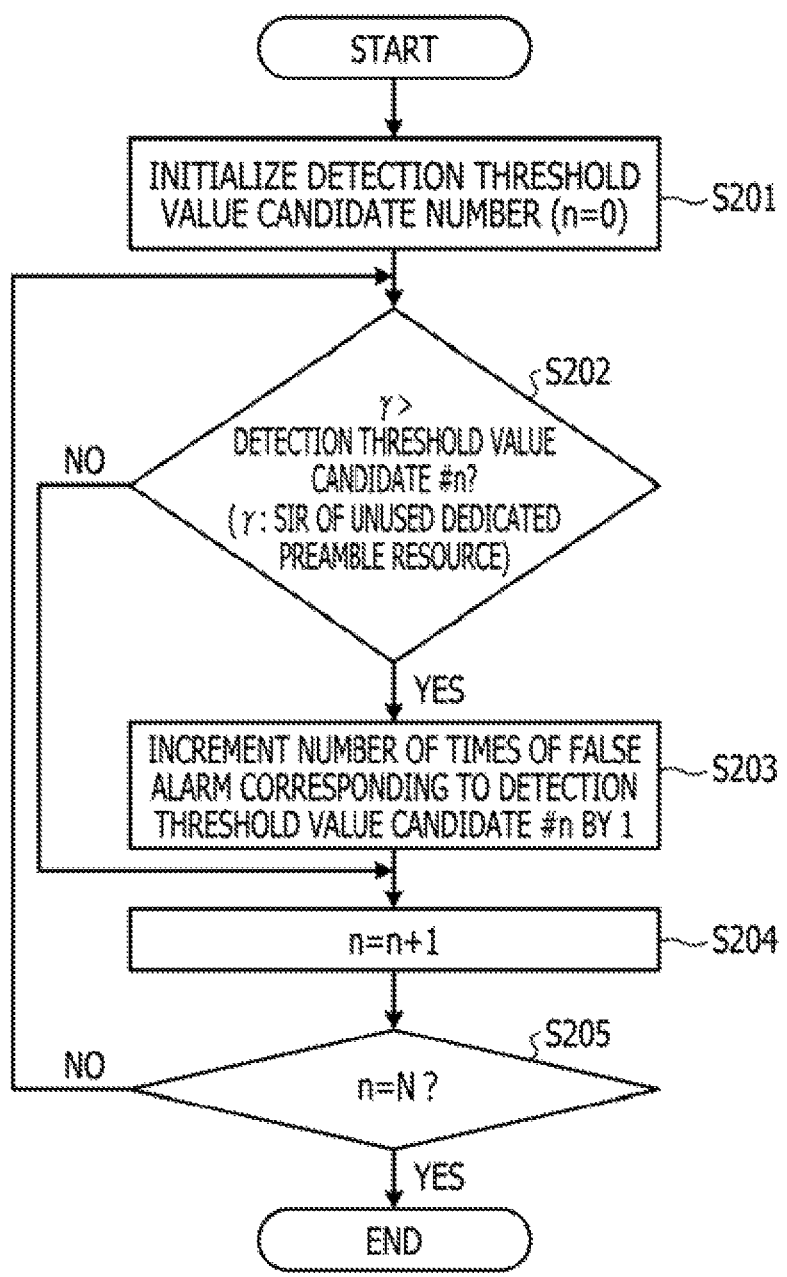
FIG. 9 is a flowchart illustrating measurement processing of false alarm by the PRACH false alarm measurement unit.

A flow of processing of the PRACH false alarm measurement unit 303 is described below with reference to FIGS. 8 and 9. FIG. 8 is a flowchart illustrating initialization processing of the number of times of false alarm by the PRACH false alarm measurement unit. In addition, FIG. 9 is a flowchart illustrating measurement processing of the number of times of false alarm by the PRACH false alarm measurement unit.

The PRACH false alarm measurement unit 303 initializes, in advance, the number of times of false alarm of each of the detection threshold value candidates, and then performs measurement of false alarm. First, the initialization processing of the number of times of false alarm by the PRACH false alarm measurement unit 303 is described below with reference to FIG. 8.

The PRACH false alarm measurement unit 303 initializes a number "n" (n=0) of a detection threshold value candidate that is a target of the initialization processing of the number of times of false alarm (Step S101). Here, the detection threshold value candidate having the number "n" is indicated as a detection threshold value candidate #n.

In addition, the PRACH false alarm measurement unit 303 initializes the number of times of false alarm corresponding to the detection threshold value candidate #n, that is, sets the number of times of false alarm at 0 (Step S102).

After that, the PRACH false alarm measurement unit 303 increments the number of the detection threshold value candidate that is the target, by 1 (n=n+1) (Step S103).

In addition, the PRACH false alarm measurement unit 303 determines whether "n=N" is satisfied (Step S104). Here, "N" is the number of detection threshold value candidates stored in the PRACH false alarm measurement unit 303. When "n=N" is not satisfied (Step S104: No), in the PRACH false alarm measurement unit 303, the flow returns to Step S102.

In addition, "n=N" is satisfied (Step S104: Yes), the PRACH false alarm measurement unit 303 ends the initialization processing of the number of times of false alarm.

The measurement processing of the number of times of false alarm by the PRACH false alarm measurement unit 303 is described below with reference to FIG. 9.

The PRACH false alarm measurement unit 303 initializes a number "n" of a detection threshold value candidate that is a target of the measurement processing of the number of times of false alarm (n=0) (Step S201).

The PRACH false alarm measurement unit 303 determines whether an SIR estimation value ($\gamma$) of an unused dedicated preamble resource is more than the detection threshold value candidate #n (Step S202). When the SIR estimation value $\gamma$ is the detection threshold value candidate #n or less (Step S202: No), in the PRACH false alarm measurement unit 303, the flow proceeds to Step S204.

In addition, when the SIR estimation value $\gamma$ is more than the detection threshold value candidate #n (Step S202: Yes), the PRACH false alarm measurement unit 303 increments the number of times of false alarm corresponding to the detection threshold value candidate #n, by 1 (Step S203).

In addition, the PRACH false alarm measurement unit 303 increments the number of the detection threshold value candidate that is the target, by 1 (n=n+1) (Step S204).

In addition, the PRACH false alarm measurement unit 303 determines whether "n=N" is satisfied (Step 205). When "n=N" is not satisfied (Step S20S: No), in the PRACH false alarm measurement unit 303, the flow returns to Step S202.

In addition, when "n=N" is satisfied (Step S205: Yes), the PRACH false alarm measurement unit 303 ends the measurement processing of the number of times of false alarm.

Figure 10:
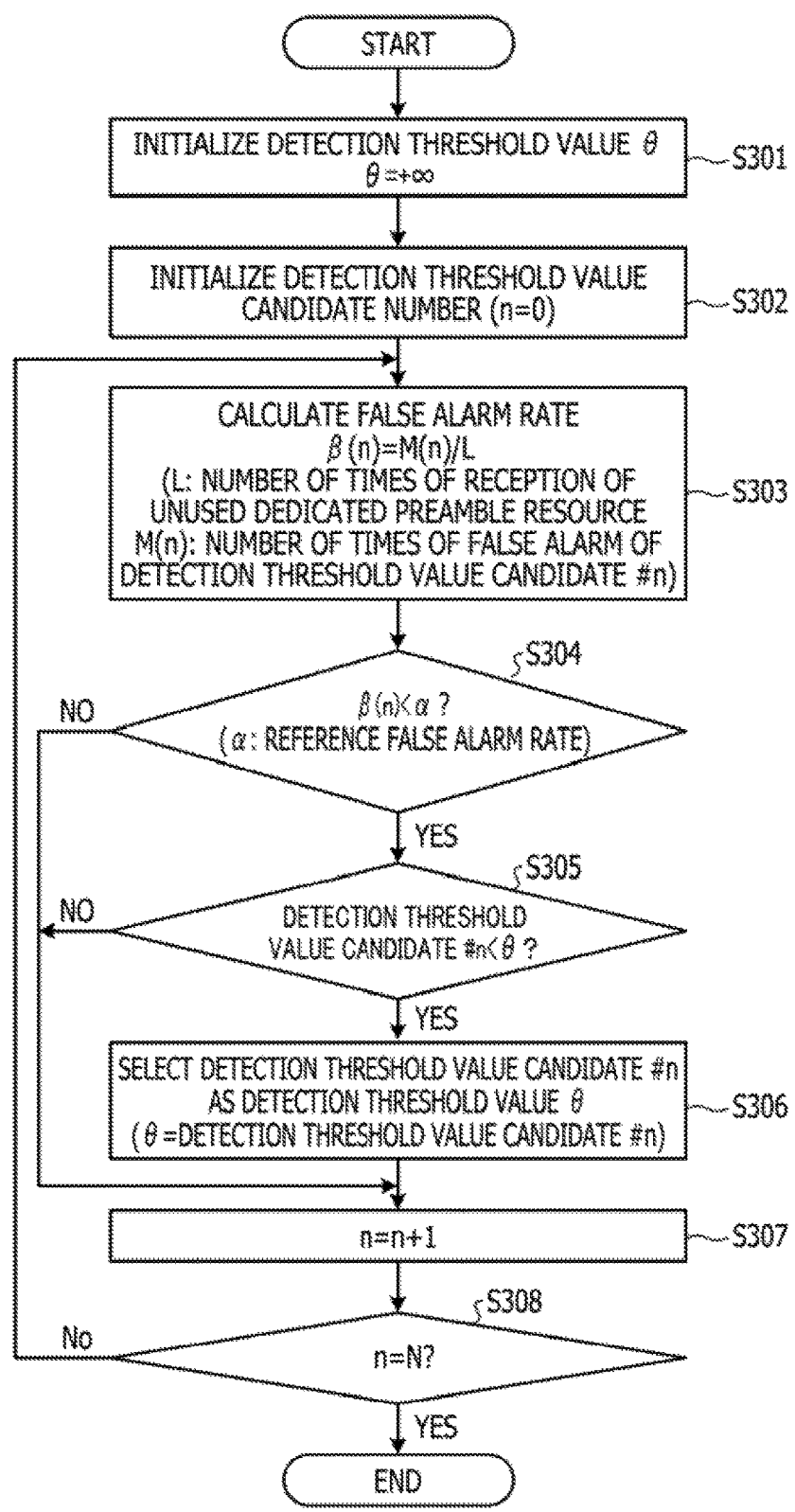
FIG. 10 is a flowchart illustrating determination processing of detection threshold value by a detection threshold value determination unit according to the first embodiment.

A flow of determination processing of a detection threshold value by the detection threshold value determination unit 304 is described below with reference to FIG. 10. FIG. 10 is a flowchart illustrating the determination processing of a detection threshold value by the detection threshold value determination unit according to the first embodiment.

The detection threshold value determination unit 304 initializes a detection threshold value $\theta$. For example, the detection threshold value determination unit 304 sets "$\theta$=+$\infty$" (for example, the maximum value in the range of values allowed to be obtained) (Step S301). For example, in a case of an "int-type" (16 bits), "32767" may be set as the initial value.

The detection threshold value determination unit 304 initializes a number "n" of a detection threshold value candidate that is a target of calculation processing of a false alarm rate (n=0) (Step S302).

In addition, the detection threshold value determination unit 304 calculates a false alarm rate ($\beta(n)$) corresponding to the detection threshold value candidate #n (Step S303). Here, when "L" is set as the number of times of calculation of an SIR estimation value using an unused dedicated preamble, and "M(n)" is set as the number of times of false alarm of the detection threshold value candidate #n, the detection threshold value determination unit 304 may calculate a false alarm rate corresponding to the detection threshold value candidate #n by using "$\beta(n)=M(n)/L$" (Step S303).

The detection threshold value determination unit 304 determines whether the false alarm rate "$\beta(n)$" is less than a reference false alarm rate "$\alpha$" (Step S304). When the false alarm rate "$\beta(n)$" is the reference false alarm rate "$\alpha$" or more (Step S304: No), in the detection threshold value determination unit 304, the flow proceeds to Step S307.

In addition, when the false alarm rate "$\beta(n)$" is less than the reference false alarm rate "$\alpha$" (Step S304: Yes), the detection threshold value determination unit 304 determines whether the detection threshold value candidate #n is less than the detection threshold value θ (Step S305). When the detection threshold value candidate #n is the detection threshold value θ or more (Step S305: No), in the detection threshold value determination unit 304, the flow proceeds to Step S307.

In addition, when the detection threshold value candidate #n is less than the detection threshold value θ (Step S305: Yes), the detection threshold value determination unit 304 selects the detection threshold value candidate #n as the detection threshold value θ (Step S306).

After that, the detection threshold value determination unit 304 increments the number "n" of the detection threshold value candidate, by 1. That is, the detection threshold value determination unit 304 sets "n=n+1" (Step S307).

In addition, the detection threshold value determination unit 304 determines whether "n=N" is satisfied (Step S308). When "n=N" is not satisfied (Step S308: No), in the detection threshold value determination unit 304, the flow returns to Step S303.

In addition, when "n=N" is satisfied (Step S308: Yes), the detection threshold value determination unit 304 ends the determination processing of the detection threshold value. After that, the detection threshold value determination unit 304 outputs the detection threshold value θ that has been obtained by such processing, to the PRACH detection unit 302 as the detection threshold value.

As described above, the base station apparatus according to the first embodiment calculates a false alarm rate for each of the detection threshold value candidates using a wireless resource determined to be unused, and performs detection of the RACH preamble transmitted through a PRACH, for a detection threshold value candidate having a false alarm rate that is a desired value or less and is the closest to the desired value (that is, a detection threshold value candidate having the smallest value, from among detection threshold value candidates having allowable false alarm rates), as a detection threshold value. As a result, a threshold value of false alarm may be dynamically changed depending on an operation environment of the base station apparatus, and the utilization efficiency of the cell may be improved.

[Second Embodiment]

A second embodiment is described below. In a determination method of a detection threshold value, a base station apparatus according to the second embodiment is different from the base station apparatus according to the first embodiment. Therefore, the determination method of a detection threshold value is described below. The base station apparatus according to the second embodiment is also illustrated by the block diagram of FIG. 1. In addition, a baseband processing unit according to the second embodiment is also illustrated by the block diagram of FIG. 2. In addition, a baseband reception unit according to the embodiment is also illustrated by FIG. 3. In addition, a PRACH reception unit according to the embodiment is also illustrated by the block diagram of FIG. 4. A description of a portion having the same function as that of the first embodiment is omitted below.

A detection threshold value determination unit 304 according to the second embodiment is described below with reference to FIG. 4. The detection threshold value determination unit 304 stores one-time increased portion and one-time decreased portion as an adjustment value of a detection threshold value. Here, when a targeted false alarm rate is set as a target false alarm rate, for example, the one-time increased portion may be determined as a value proportional to the value obtained by subtracting the target false alarm rate from 1. In addition, the one-time decreased portion may be determined as a value proportional to the target false alarm rate. In addition, it is desirable that each of the adjustment values is used so as to be multiplied by a step size smaller than 1 in order to avoid the influence of the instantaneous fluctuation in the communication state.

The detection threshold value determination unit 304 receives an input of an SIR of an unused dedicated preamble resource, from the PRACH false alarm measurement unit 303. In addition, the detection threshold value determination unit 304 compares the current detection threshold value with the received SIR of the dedicated preamble resource.

When the SIR of the dedicated preamble resource is more than the current detection threshold value, the detection threshold value determination unit 304 sets a value obtained by adding the increased portion of the detection threshold value to the current detection threshold value, as a new detection threshold value.

In addition, when the SIR of the dedicated preamble resource is the current detection threshold value or less, the detection threshold value determination unit 304 sets a value obtained by subtracting the decreased portion of the detection threshold value from the current detection threshold value, as a new detection threshold value.

As described above, it may be expected that the false alarm rate converges to the target value by adjusting the detection threshold value gradually using the adjustment value.

Figure 11:
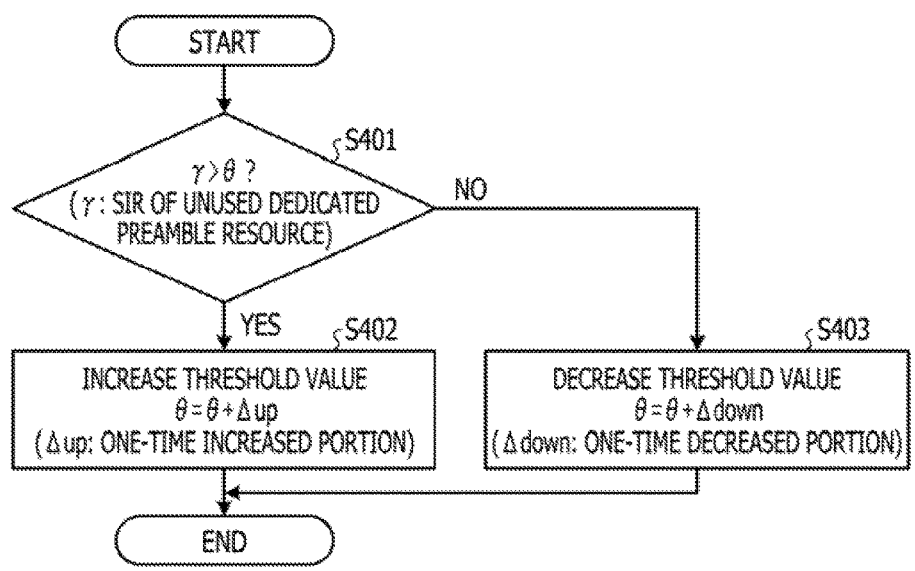
FIG. 11 is a flowchart illustrating determination processing of detection threshold value by a detection threshold value determination unit according to a second embodiment.

A flow of determination processing of a detection threshold value by the detection threshold value determination unit 304 according to the second embodiment is described below with reference to FIG. 11. FIG. 11 is a flowchart illustrating the determination processing of a detection threshold value by the detection threshold value determination unit according to the second embodiment.

The detection threshold value determination unit 304 receives the input of the SIR of the unused dedicated preamble resource, from the PRACH false alarm measurement unit 303. In addition, the detection threshold value determination unit 304 determines whether the SIR (γ) of the dedicated preamble resource is more than the current detection threshold value θ (Step S401).

When the SIR (γ) of the dedicated preamble resource is more than the current detection threshold value θ (Step S401: Yes), the detection threshold value determination unit 304 sets a value obtained by adding the one-time increased portion (Δup) of the detection threshold value to the current detection threshold value, as a new detection threshold value (Step S402).

In addition, when the SIR (γ) of the dedicated preamble resource is the current detection threshold value θ or less (Step S401: No), the detection threshold value determination unit 304 sets a value obtained by subtracting the one-time decreased portion (Δdown) of the detection threshold value from the current detection threshold value, as a new detection threshold value (Step S403).

As described above, the determination method of a detection threshold value may be achieved by various methods. In addition, even when the different determination method of a detection threshold value is used, similar to the first embodiment, a threshold value of false alarm may be dynamically changed depending on an operation environment of the base station apparatus, and the utilization efficiency of the cell may be improved.

[Third Embodiment]

Figure 12:
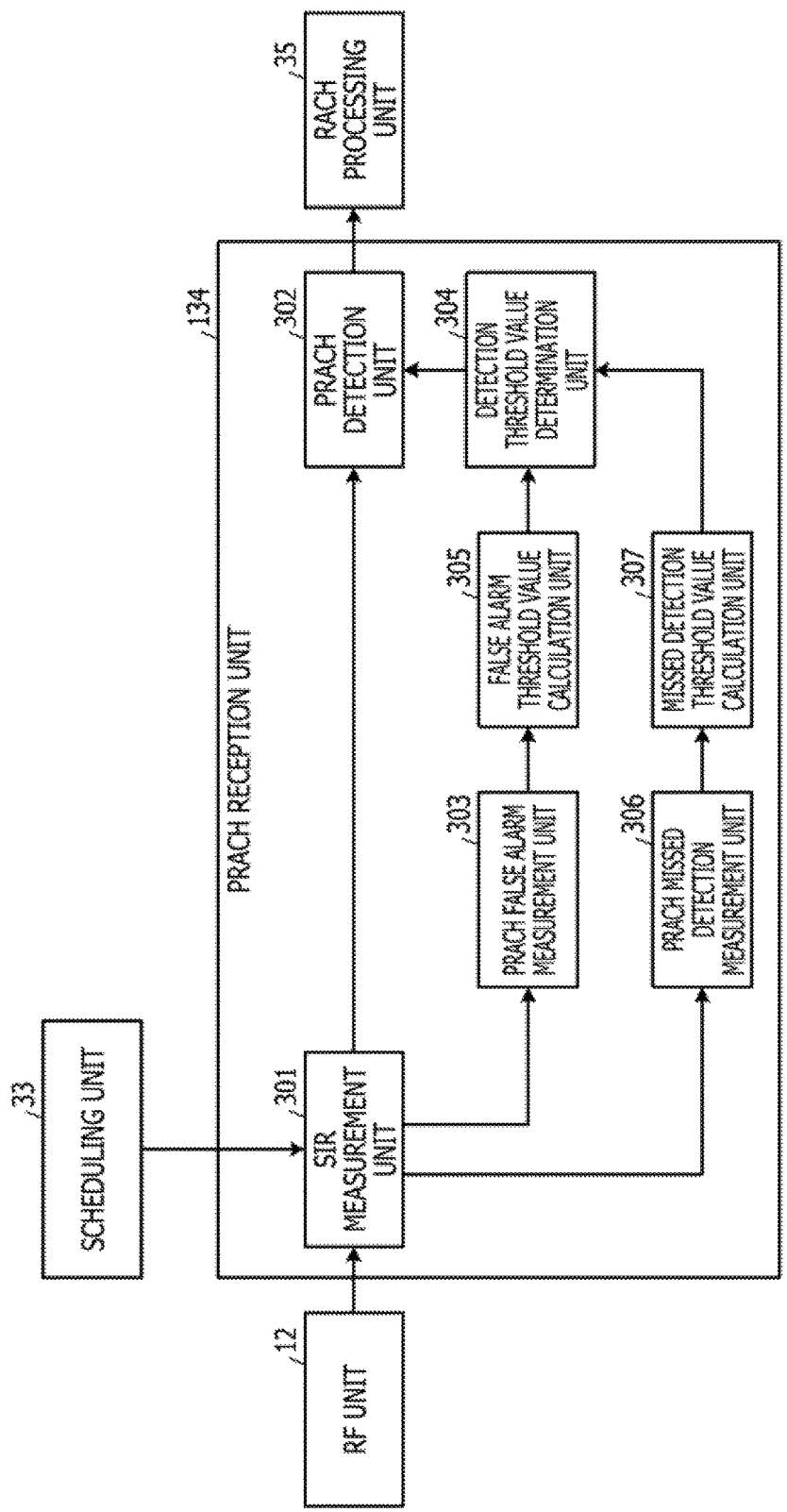
FIG. 12 is a block diagram illustrating the detail of a PRACH reception unit according to the second embodiment.

FIG. 12 is a block diagram illustrating the detail of a PRACH reception unit according to a third embodiment. A base station apparatus according to the third embodiment is different from the first embodiment in that a detection threshold value is determined using a missed detection rate indicating a probability that detection of a signal that has been transmitted actually is not performed successfully, in addition to the false alarm rate. Therefore, the determination of a detection threshold value is mainly described below. A description of a function in each unit of the base station apparatus according to the third embodiment, which is the same as that of the first embodiment, is omitted below.

As illustrated in FIG. 12, a PRACH reception unit 134 according to the third embodiment includes an SIR measurement unit 301, a PRACH detection unit 302, a PRACH false alarm measurement unit 303, a detection threshold value determination unit 304, a false alarm threshold value calculation unit 305, a PRACH missed detection measurement unit 306, and a missed detection threshold value calculation unit 307.

The SIR measurement unit 301 receives the RACH preamble transmitted through the PRACH from the RF unit 12. In addition, the SIR measurement unit 301 calculates SIR estimation values of a preamble resource other than a dedicated preamble resource and a dedicated preamble resource specified to be used. In addition, the SIR measurement unit 301 also calculates an SIR estimation value of an unused dedicated preamble resource.

The SIR measurement unit 301 outputs the calculated SIR estimation value of the unused dedicated preamble resource, to the PRACH false alarm measurement unit 303.

In addition, the SIR measurement unit 301 obtains information on a wireless communication terminal 3 corresponding to the dedicated preamble resource specified to be used and the number of times of PRACH scheduling, from the scheduling unit 33.

In addition, the SIR measurement unit 301 associates the SIR estimation value of the dedicated preamble resource specified to be used, with the information on the wireless communication terminal 3 corresponding to the dedicated preamble resource and the number of times of PRACH scheduling, and outputs the associated SIR estimation value and the information, to the PRACH missed detection measurement unit 306. In this case, the SIR measurement unit 301 performs transmission of an SIR estimation value at the time of missed detection, that is, when the detection has not been performed successfully and the retransmission has been performed, in addition to the SIR estimation value when the detection has been performed successfully.

Similar to the first embodiment, the PRACH false alarm measurement unit 303 obtains the number of times of false alarm corresponding to each of the detection threshold value candidates, and outputs the obtained number of times of false alarm, to the false alarm threshold value calculation unit 305.

The false alarm threshold value calculation unit 305 accepts the input of the number of times of false alarm corresponding to each of the detection threshold value candidates, from the PRACH false alarm measurement unit 303. In addition, the false alarm threshold value calculation unit 305 calculates a false alarm rate for each of the detection threshold value candidates using the obtained number of times of false alarm corresponding to each of the obtained detection threshold value candidates. In addition, the false alarm threshold value calculation unit 305 determines a detection threshold value candidate in which the false alarm rate is less than a reference false alarm rate and is the smallest, as a false alarm threshold value. After that, the false alarm threshold value calculation unit 305 outputs the determined false alarm threshold value to the detection threshold value determination unit 304.

That is, the false alarm threshold value calculation unit 305 determines a false alarm threshold value by the same processing as the determination processing of a detection threshold value by the detection threshold value determination unit 304 according to the first embodiment.

Similar to the PRACH false alarm measurement unit 303, the PRACH missed detection measurement unit 306 stores a plurality of detection threshold value candidates in advance. The PRACH missed detection measurement unit 306 receives the inputs of the SIR estimation value of the dedicated preamble resource specified to be used, the information on the wireless communication terminal 3 corresponding to the dedicated preamble resource, and the number of times of PRACH scheduling, from the SIR measurement unit 301. In this case, the PRACH missed detection measurement unit 306 also receives an SIR estimation value at the PRACH scheduling timing at which the detection has not been performed successfully, and the retransmission has been performed, from the SIR measurement unit 301. In addition, the PRACH missed detection measurement unit 306 associates the SIR estimation value with the information on the wireless communication terminal 3 and the number of times of PRACH scheduling, and stores the associated SIR estimation value and the information.

As described in the above processing of the RACH procedure, here, in the RACH procedure, the processing called power ramping is executed in which the power is increased each time retransmission is performed. Therefore, an SIR in each of the PRACH scheduling timing may be estimated by using the SIR estimation value of the RACH preamble that has been received through the PRACH and the power-increased portion by the power ramping.

Therefore, the PRACH missed detection measurement unit 306 subtracts the one-time increased portion by the power ramping from an SIR estimation value of the final RACH preamble transmitted through the PRACH to calculate an SIR estimation value at each of the PRACH scheduling timing. The calculated SIR estimation value is referred to as "calculation SIR estimation value" for the SIR estimation value that has been received from the SIR measurement unit 301.

Here, the PRACH missed detection measurement unit 306 stores a reference SIR that is measurement reference. The reference SIR is an SIR when the missed detection rate becomes a desired value. For example, in a case in which it is expected that the missed detection rate becomes 1% when the SIR is 0 dB, the reference SIR becomes 0 dB when the desired missed detection rate is 1%.

In addition, the PRACH missed detection measurement unit 306 subtracts the reference SIR estimation value from the calculation SIR estimation value to obtain a difference between the reference SIR and the calculation SIR estimation value, for each of the PRACH scheduling timing. That is, the difference indicates a difference between the actual state and the ideal state. In addition, the PRACH missed detection measurement unit 308 subtracts the difference between the reference SIR and the calculation SIR estimation value, from the SIR estimation value at the PRACH scheduling timing and corrects the SIR estimation value to obtain a post-correction SIR estimation value. The post-correction SIR estimation value indicates an SIR estimation value in the case of the ideal state.

In addition, the PRACH missed detection measurement unit 306 compares the post-correction SIR estimation value for each of the PRACH scheduling timing with each of the detection threshold value candidates. In addition, when the post-correction SIR estimation value is less than the detection threshold value candidate, the PRACH missed detection measurement unit 306 adds 1 to the number of times of missed detection corresponding to the detection threshold value candidate.

The PRACH missed detection measurement unit 306 repeats the above-described calculation processing of the number of times of missed detection by the certain number of times. The number of repetitions may be different from or the same as the number of repetitions of the calculation processing of the number of times of false alarm by the PRACH false alarm measurement unit 303. In addition, the PRACH missed detection measurement unit 306 outputs the number of times of false alarm for each of the detection threshold value candidates, to the missed detection threshold value calculation unit 307.

The missed detection threshold value calculation unit 307 receives the input of the number of times of false alarm for each of the detection threshold value candidates, from the PRACH missed detection measurement unit 306. In addition, the missed detection threshold value calculation unit 307 determines a detection threshold value candidate having the largest value from among detection threshold value candidates in each of which the number of times of false alarm falls below the missed detection rate that has been set in advance, as a missed detection threshold value. In addition, the missed detection threshold value calculation unit 307 outputs the determined missed detection threshold value to the detection threshold value determination unit 304.

The detection threshold value determination unit 304 receives the input of the false alarm threshold value, from the false alarm threshold value calculation unit 305. In addition, the detection threshold value determination unit 304 receives the input of the missed detection threshold value, from the missed detection threshold value calculation unit 307. In addition, the detection threshold value determination unit 304 calculates an average value of the false alarm threshold value and the missed detection threshold value and sets the average value as a detection threshold value. In addition, the detection threshold value determination unit 304 outputs the detection threshold value to the PRACH detection unit 302.

Figure 13:
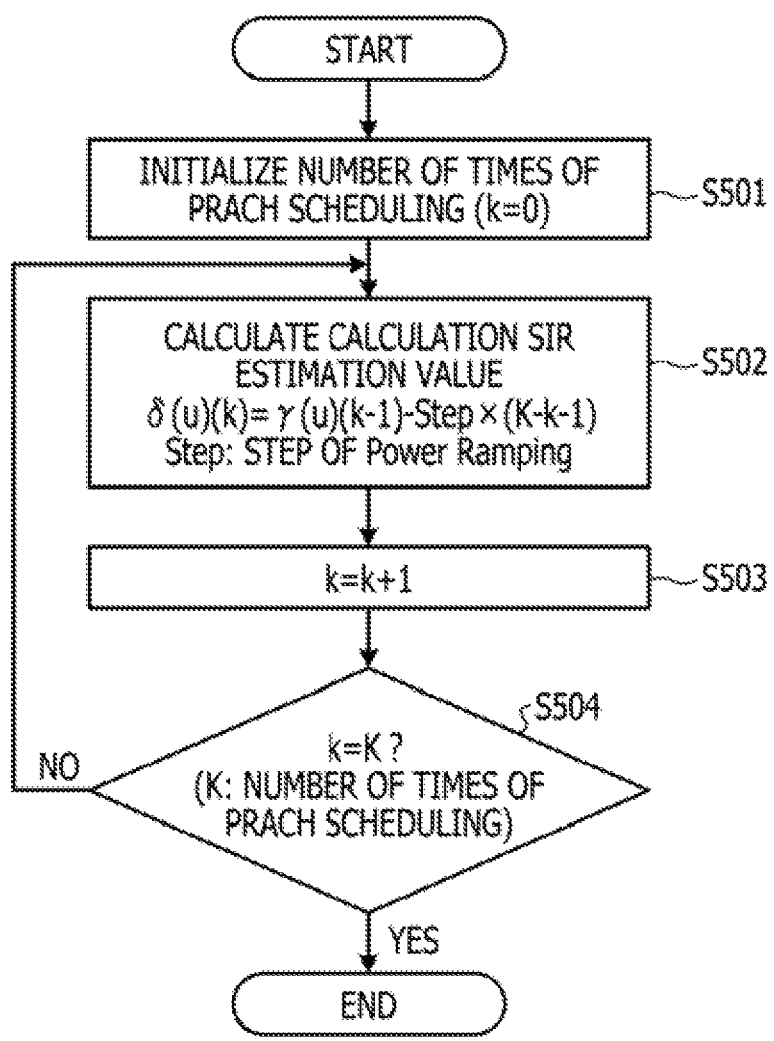
FIG. 13 is a flowchart illustrating calculation processing of a calculation SIR estimation value by a PRACH missed detection measurement unit.

A flow of calculation processing of a calculation SIR estimation value by the PRACH missed detection measurement unit 306 is described below with reference to FIG. 13. FIG. 13 is a flowchart illustrating the calculation processing of a calculation SIR estimation value by the PRACH missed detection measurement unit.

The PRACH missed detection measurement unit 306 initializes the number of loops k of PRACH scheduling (Step S501). Here, the PRACH missed detection measurement unit 306 sets "k" at 0. In addition, here, the number of times of PRACH scheduling is represented as "K". That is, "k" is a natural number that is 0 or more and "K" or less. In addition, an SIR estimation value at timing of the k-th loop of the PRACH scheduling of a wireless communication terminal u is represented as "T(u)(k)". In this case, an SIR estimation value becomes "T(u)(K−1)" when transmission of a preamble through a PRACH from the wireless communication terminal u has been detected.

The PRACH missed detection measurement unit 306 calculates a calculation SIR estimation value "σ(u)(k)" at the timing of the k-th loop (Step S502) by subtracting a value obtained by multiplexing the difference between the number of loops k and the number of times of PRACH scheduling K by one-time increased portion (step) by power ramping, from "T(u)(K−1)".

After that, the PRACH missed detection measurement unit 306 increments the number of loops k of the PRACH scheduling, by 1. That is, the PRACH missed detection measurement unit 306 sets "k=k+1" (Step S503).

In addition, the PRACH missed detection measurement unit 306 determines whether "k=K" is satisfied (Step S504). When "k=K" is not satisfied (Step S504: No), in the PRACH missed detection measurement unit 306, the flow returns to Step S502.

In addition, when "k=K" is satisfied (Step S504: Yes), the detection threshold value determination unit 304 ends the calculation processing of the calculation SIR estimation value.

A flow of calculation processing of the number of times of missed detection by the missed detection threshold value calculation unit 307 is described below with reference to FIG. 14. FIG. 14 is a flowchart illustrating the calculation processing of the number of times of missed detection by the missed detection threshold value calculation unit.

The missed detection threshold value calculation unit 307 initializes a number "n" of a detection threshold value candidate that is a target of the calculation processing of the number of times of missed detection (n=0) (Step S601).

The missed detection threshold value calculation unit 307 subtracts Σ that is a reference SIR from "σ(u)(k)" that is the calculation SIR estimation value at the timing of the k-th loop. In addition, the missed detection threshold value calculation unit 307 calculates "σ'" that is a post-correction SIR estimation value by subtracting the calculation result from "T(u)(k)" that is the SIR estimation value at the timing of the k-th loop (Step S602).

After that the missed detection threshold value calculation unit 307 determines whether the detection threshold value candidate #n is less than "σ'" that is the calculated post-correction SIR estimation value (Step S603). When the detection threshold value candidate #n is "σ'" or more (Step S603: No), in the missed detection threshold value calculation unit 307, the flow proceeds to Step S605.

In addition, when the detection threshold value candidate #n is less than "σ'" (Step S603: Yes), the missed detection threshold value calculation unit 307 increments the number of times of missed detection corresponding to the detection threshold value candidate #1, by 1 (Step S604).

After that the missed detection threshold value calculation unit 307 increments the number n of the detection threshold value candidate, by 1. That is, the missed detection threshold value calculation unit 307 sets "n=n+1" (Step S605).

After that, the missed detection threshold value calculation unit 307 determines whether "n=N" is satisfied (Step S606). When "n=N" is not satisfied (Step S606: No), in the missed detection threshold value calculation unit 307, the flow returns to Step S603.

In addition, when "n=N" is satisfied (Step S606: Yes), the missed detection threshold value calculation unit 307 ends the calculation processing of the number of times of missed detection.

As described above, the wireless base station apparatus according to the third embodiment selects a value in which the false alarm rate is lower than the false alarm rate threshold value, and the missed detection rate is higher than the missed detection rate threshold value, as a detection threshold value, and performs detection of transmission through a PRACH using the selected detection threshold value. As a result, frequent occurrence of false alarm due to a too low detection threshold value and frequent failure of detection due to a too high detection threshold value may be avoided, so that the utilization efficiency of the cell may be improved.

[Fourth Embodiment]

A fourth embodiment is described below. The fourth embodiment is different from the third embodiment in that a calculation SIR estimation value of a PRACH is calculated from an SIR estimation value of a RACH message 3 that has been transmitted using a PUSCH according to the fourth embodiment, and a post-correction SIR estimation value is obtained using the calculation SIR estimation value. The PRACH reception unit according to the embodiment is also illustrated by the block diagram of FIG. 12. A description of a portion having the same function as the third embodiment is omitted below.

The SIR measurement unit 301 receives a dedicated preamble specified to be used. Hereinafter, the dedicated preamble specified to be used is simply referred to as "dedicated preamble". In addition, the SIR measurement unit 301 calculates an SIR estimation value of the dedicated preamble, and transmits the calculated SIR estimation value to the PRACH missed detection measurement unit 306. In addition, the SIR measurement unit 301 transmits the SIR estimation value to the PRACH detection unit 302.

The PRACH detection unit 302 receives the input of the SIR estimation value from the SIR measurement unit 301. In addition, the PRACH detection unit 302 performs detection of the RACH preamble transmitted through the PRACH. When the detection of the RACH preamble transmitted through the PRACH has been performed successfully, that is, when the detection of the received dedicated preamble has been performed successfully, the PRACH detection unit 302 notifies the RACH processing unit 35 of the detection that has been performed successfully.

The RACH processing unit 35 receives the notification of the detection of the RACH preamble transmitted through the PRACH, which has been performed successfully, from the PRACH detection unit 302. In addition, the RACH processing unit 35 generates a RACH Message 2, and secures a wireless resource used for transmission of a RACH Message 3. In addition, the RACH processing unit 35 transmits the RACH Message 2 to the baseband transmission unit 34, and notifies the baseband transmission unit 34 of information on the secured wireless resource. The RACH processing unit 35 is an example of "notification unit".

The wireless communication terminal 3 transmits the RACH Message 3 to the base station apparatus 1, using the wireless resource of the RACH Message 3, which has been specified by the RACH processing unit 35.

After that, the SIR measurement unit 301 obtains the RACH Message 3 from the wireless communication terminal 3 corresponding to the detected dedicated preamble. After that, the SIR measurement unit 301 calculates an SIR estimation value of the RACH Message 3. In addition, the SIR measurement unit 301 outputs the SIR estimation value of the RACH Message 3, to the PRACH missed detection measurement unit 306.

The PRACH missed detection measurement unit 306 receives the input of the SIR estimation value of the dedicated preamble, from the SIR measurement unit 301. After that, when the detection of the dedicated preamble has been performed successfully, the PRACH missed detection measurement unit 306 receives the input of the SIR estimation value of the RACH Message 3 corresponding to the dedicated preamble, from the SIR measurement unit 301.

In addition, the PRACH missed detection measurement unit 306 calculates a calculation SIR estimation value of the dedicated preamble, using an electric power rate between the RACH Message 3 and the PRACH for the SIR estimation value of the RACH Message 3.

After that, the PRACH missed detection measurement unit 306 calculates a post-correction SIR estimation value by subtracting the reference SIR from the calculation SIR estimation value of the dedicated preamble, and subtracting the subtraction result from the SIR estimation value of the dedicated preamble.

After that, the PRACH missed detection measurement unit 306 obtains the number of times of missed detection corresponding to each of the detection threshold value candidates, using the post-correction SIR estimation value.

The PRACH missed detection measurement unit 306 repeats the above-described 6calculation processing of the number of times of missed detection by the certain number of times. In addition, the PRACH missed detection measurement unit 306 outputs the number of times of missed detection corresponding to each of the detection threshold value candidates, to the missed detection threshold value calculation unit 307.

The subsequent processing of the missed detection threshold value calculation unit 307 and the detection threshold value determination unit 304 is similar to that of the second embodiment.

As described above, the base station apparatus according to the embodiment obtains a calculation SIR estimation value of the RACH preamble transmitted through a PRACH using a RACH Message 3 corresponding to the RACH preamble transmitted through the PRACH and calculates a post-correction SIR estimation value. As a result, for example, even when reception of the dedicated preamble specified to be used has been performed successfully once without retransmission, a missed detection threshold value may be calculated.

In addition, the third embodiment and the fourth embodiment may be combined. That is, the base station apparatus may execute both of the processing in which a calculation SIR estimation value at the time of PRACH missed detection is traced and obtained from an SIR estimation value the reception of which has been performed successfully finally, and the processing in which a calculation SIR estimation value of the corresponding RACH preamble transmitted through the PRACH is obtained from the RACH Message 3. In that case, after both of the pieces of processing are executed, one of the calculation SIR estimation values may be used, or an average value of the calculation SIR estimation values may be obtained. In addition, one of the pieces of processing may be selectively executed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station comprising:
a memory; and
a processor coupled to the memory and configured to:

determine when a random access signal is detected by comparing each specified characteristic of each of a plurality of radio resources arranged for a respective random access signal with a detection threshold, each specified characteristic relates to a reception power of each of the plurality of radio resources arranged for the respective random access signal, the plurality of radio resources being divided into first radio resources and second radio resources, the first radio resources being arranged for dedicated random access signals each transmitted from each of a plurality of terminals in response to a request signal transmitted from the base station, the second radio resources being arranged for common random access signals each transmitted from each of a plurality of terminals without the request signal transmitted from the base station, determine the detection threshold based on each specified characteristic of each unused first radio resources, each of the unused first radio resources are the first radio resources for which each request signal has not been transmitted from the base station; and estimate missed detection rates corresponding to candidates of the detection threshold by comparing the specified characteristic of each used first radio resources with each of the candidates of detection threshold, each of the used first radio resources are the first radio resources for which each request signal has been transmitted from the base station.

2. The base station according to claim 1, wherein
the processor is further configured to estimate false alarm rates corresponding to the candidates of detection threshold by comparing the specified characteristic of each of the unused first radio resources with each of the candidates of detection threshold, and
the detection threshold is selected from among the candidates of detection threshold based on the estimated false alarm rates.

3. The base station according to claim 2, wherein
the detection threshold is selected from among the candidates of detection threshold based on the estimated missed detection rates.

4. The base station according to claim 1, wherein
each specified characteristic is a signal to Interference rate (SIR) of each of the radio resources arranged for each random access signal.

5. The base station according to claim 1, wherein
the dedicated random access signals are non-contention based preambles, and
the common random access signals are contention based preambles.

6. A control method comprising:
determining when a random access signal is detected by comparing each specified characteristic of each of a plurality of radio resources arranged for a respective random access signal with a detection threshold, each specified characteristic relates to a reception power of each of the plurality of radio resources arranged for the respective random access signal, the plurality of radio resources being divided into first radio resources and second radio resources, the first radio resources being arranged for dedicated random access signals each transmitted from each of a plurality of terminals in response to a request signal transmitted from a base station, the second radio resources being arranged for common random access signals each transmitted from each of a plurality of terminals without the request signal transmitted from the base station;

determining the detection threshold based on each specified characteristic of each unused first radio resources, each of the unused first radio resources are the first radio resources for which each request signal has not been transmitted from the base station; and estimating missed detection rates corresponding to candidates of the detection threshold by comparing the specified characteristic of each used first radio resources with each of the candidates of detection threshold, each of the used first radio resources are the first radio resources for which each request signal has been transmitted from the base station.

* * * * *